United States Patent
Lyons

(10) Patent No.: US 10,530,822 B2
(45) Date of Patent: Jan. 7, 2020

(54) SYSTEM AND METHOD FOR REDUCING NETWORK DEPENDENCIES FOR STREAMING CONTENT

(71) Applicant: Bally Gaming, Inc., Las Vegas, NV (US)

(72) Inventor: Martin S. Lyons, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1000 days.

(21) Appl. No.: 14/563,970

(22) Filed: Dec. 8, 2014

(65) Prior Publication Data

US 2015/0163270 A1 Jun. 11, 2015

Related U.S. Application Data

(60) Provisional application No. 61/913,816, filed on Dec. 9, 2013.

(51) Int. Cl.
*H04L 29/06* (2006.01)
*G07F 17/32* (2006.01)

(52) U.S. Cl.
CPC .......... *H04L 65/60* (2013.01); *G07F 17/3223* (2013.01)

(58) Field of Classification Search
CPC ..... G07F 17/3223; G07F 17/323; H04L 65/60
USPC ......................................................... 463/42
See application file for complete search history.

(56) References Cited

U.S. PATENT DOCUMENTS

| 5,838,909 | A | 11/1998 | Roy et al. |
|---|---|---|---|
| 8,769,139 | B2 | 7/2014 | Dazzi |
| 2008/0184229 | A1 | 7/2008 | Rosu et al. |
| 2008/0222375 | A1 | 9/2008 | Kotsovinos et al. |
| 2009/0149253 | A1* | 6/2009 | Kelly .................. G07F 17/3267 463/36 |
| 2010/0311505 | A1* | 12/2010 | Oberberger ............. G07F 17/32 463/42 |
| 2012/0137287 | A1 | 5/2012 | Pang et al. |
| 2012/0184373 | A1 | 7/2012 | Kim et al. |
| 2013/0132944 | A1* | 5/2013 | Davis .................. G06F 9/44521 718/1 |

(Continued)

FOREIGN PATENT DOCUMENTS

KR 1008268710000 5/2008

*Primary Examiner* — Jay Trent Liddle
*Assistant Examiner* — Ryan Hsu
(74) *Attorney, Agent, or Firm* — Marvin A. Hein

(57) ABSTRACT

A system and method for reducing network dependencies for streaming content is disclosed. According to one embodiment, a host streaming server is configured to host a plurality of host virtual machines for hosting a host instance of a plurality of content packages and provide the selected instances of the content packages to a plurality of client gaming devices over a network. Each of a plurality of local streaming servers is associated with a group of client gaming devices and communicates with the host streaming server over the communication network. A local streaming server has a memory storing at least one content package, and is configured to host one or more local virtual machines for hosting a local instance of the host instance. A director module controls migration of the host instance to the local instance from the host streaming server to at least one of the plurality of local streaming servers.

17 Claims, 12 Drawing Sheets

(56) References Cited

U.S. PATENT DOCUMENTS

2014/0094279 A1* 4/2014 Lockard .............. G07F 17/3272
  463/25
2015/0172760 A1* 6/2015 AbiEzzi ............. H04N 21/4437
  725/39

* cited by examiner

SYSTEM AND METHOD FOR REDUCING NETWORK DEPENDENCIES FOR STREAMING CONTENT

CROSS-REFERENCE TO RELATED APPLICATIONS

This application claims the benefit of U.S. Provisional Patent Application No. 61/913,816, filed Dec. 9, 2013, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The field of the present disclosure relates to systems and methods for reducing network dependencies, and more particularly, to systems and methods for reducing network dependencies for streaming content.

BACKGROUND

It has been known to provide streaming content to devices including gaming terminals as disclosed. A potential disadvantage of a streaming architecture is reliance upon the network bandwidth. The network must have an adequate bandwidth to support, for example, concurrent streams to multiple client devices such as gaming terminals, while providing a high degree of reliability. When a network failure occurs between a client device and a streaming server that delivers content, certain functionalities cease. Where the client device is a gaming terminal, such interruption results in lost revenue until the network functionality is restored because the player may not make wagers and play the game. Aside from the monetary losses, particularly in a gaming environment, network failures can have a negative effect on the goodwill and reputation of the streaming content provider such as a casino. The foregoing problem resulting from network failures does not exist with standalone gaming devices that do not rely upon network delivered content and routing player inputs to a remote host. An existing solution to the network failure problem is to invest in a high performance network aiming at 99.999% uptime. Such a solution is expensive and does not solve the problem of a network failure affecting all of the streaming gaming terminals on a casino floor.

To reduce the consumption of network bandwidth, a remote server compresses data files, (e.g., content for delivery) through known streaming protocols such as Real-Time Streaming Protocol (RTSP), MICROSOFT Windows Media HTTP Streaming Protocol (MS-WMSP) and Real-Time Messaging Protocol (RTMP). In a commonly owned U.S. Patent Application Pub. No. 2013/0097220, filed Oct. 14, 2011 as Ser. No. 13/273,555 and entitled "STREAMING BITRATE CONTROL AND MANAGEMENT," the disclosure of which is incorporated by reference, there is disclosed a technique for managing the compression to improve the consumption of network bandwidth. Even though compression techniques may improve the consumption of network bandwidth, the problem for streaming content remains because network failures occur and reliability issues remain.

The use of virtual machines ("VMs") is known. A host server may host several VMs, and each VM operates an instance of a game including graphic content. One host server may host multiple VMs accessed by terminals over the network. The use of VMs reduces hardware costs. Where VMs are used it is possible to migrate the interactive game instance from one host server to another host server with minimal downtime. This is also referred to as a "live migration." Citrix Systems Inc. of Santa Clara, Calif. provides a hypervisor that supports live migration under the name XenMotion®.

The migration solution by CITRIX has several problems causing it unsuitable for a gaming use. The migration solution by CITRIX achieves the downtime of 50-300 ms for a virtual machine to be moved from one host to another. For a streaming gaming machine (or even a streaming video game), any pause in the interactive experience is noticeable to the user. Second, XenMotion® (and the VMWARE equivalent VMotion®) does not support the live migration of content applications that use graphics processing units ("GPUs"). Instead, XenMotion® uses a CPU Memory Management Unit (MMU) feature called "page faults" to assist in the synchronization of memory content between the old host and the new host. A page fault is not necessarily a "fault" in the conventional meaning of the word. Instead, it is a feature that allows an operating system to detect that an application is attempting to access memory that is currently not available. Page faults are often used to provide virtual memory to applications. In Windows XP, for example, each application has access to a memory space of 4 gigabytes but only 1 gigabyte may be physically present. The operating system maintains a table that maps physical memory as needed to applications. If an application is dormant, its memory content may be moved to a disk storage, and the associated pages are marked as such. Any access from the application to the memory on the disk causes a page fault that the operating system handles by returning the memory content from the disk before continuing to execute the application.

Page faults can be used by the Xen hypervisor during the migration of a virtual machine ("VM") to keep checking pages that have been accessed by an application of the operating system ("OS") running within the VM. These pages must be sent, and the heuristics are used to limit re-sends and balance the final downtime, when heavily used pages must be sent with both the original and destination VM suspended (i.e., the "stop and copy" phase).

Generally, the hardware functionalities of a GPU are not exposed at a device driver level, therefore the CPU of a host computer is not aware of a GPU page accessible via page faults. The Xen hypervisor does not support live migration of a GPU memory because it cannot determine the areas of the GPU memory that are dynamically changing or remaining static. One way of achieving live migration of a GPU would be to perform synchronization of the entire GPU memory during the "stop and copy" phase of the migration. However, because typical GPUs have as much as 1 gigabyte of data to be synchronized, the synchronization of the entire GPU memory would lead to significant downtime on any conventional network. The present disclosure provides better synchronization performance without affecting the downtime.

The present disclosure is directed toward providing a solution to the above drawbacks and reducing network dependencies in streaming content to numerous gaming terminals, particularly in an environment of a casino.

SUMMARY

Briefly, and in general terms, various embodiments are directed to a system and method for reducing network dependencies for streaming content. In some embodiments, a host streaming server is configured to host a plurality of host virtual machines for hosting a host instance of a plurality of content packages and provide the selected instances of the content packages to a plurality of client gaming devices over a network. Each of a plurality of local streaming servers is associated with a group of client gaming devices and communicates with the host streaming server over the communication network. A local streaming server has a memory storing at least one content package, and is configured to host one or more local virtual machines for hosting a local instance of the host instance. A director module controls migration of the host instance to the local instance from the host streaming server to at least one of the plurality of local streaming servers.

In another embodiment, a director module has a host interface to a host streaming server, an interface to a local streaming server associated with a group of client gaming devices, and an interface to a player tracking module of the client gaming devices. The director module is configured to control migration of a host instance of game content to a local instance of a local streaming server.

In another embodiment, a method is disclosed for reducing network dependencies for streaming game content. The method includes: providing a director module configured to control migration of a host instance of game content to a local instance from a host streaming server to a local streaming server; receiving a request for starting a game instance from a requesting client; determining if the game content is available at a local virtual machine to control the host streaming server to stream the host instance of the game content to the requesting client from a host virtual machine; determining, if no host virtual machine is initialized, initialize the host instance of the game content; streaming the game content to the requesting client; and downloading the game content to a local memory associated with a logical group of the requesting client.

The foregoing summary does not encompass the claimed invention in its entirety, nor are the embodiments intended to be limiting. Rather, the embodiments are provided as mere examples.

DETAILED DESCRIPTION

Figure 1:
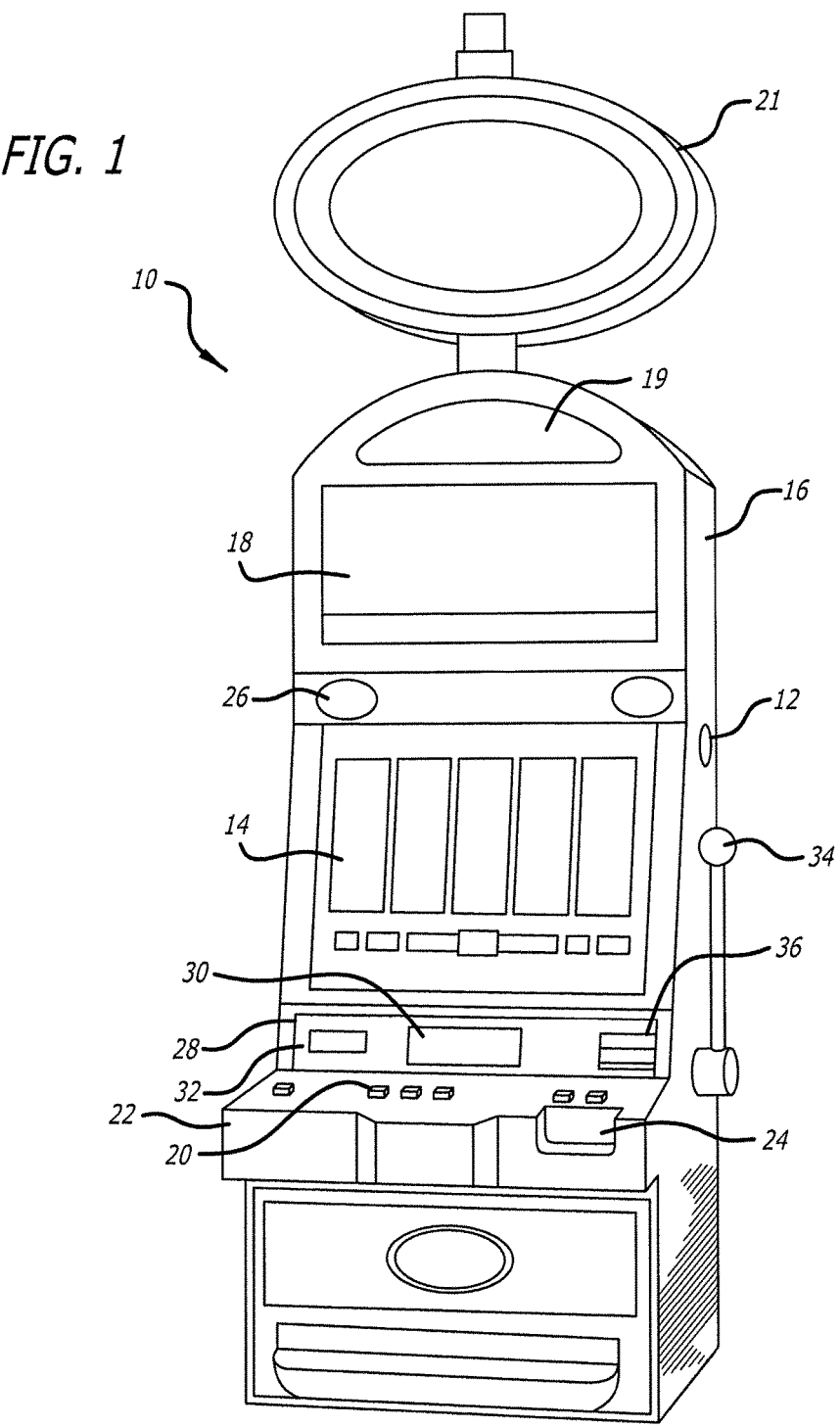
FIG. 1 illustrates an exemplary gaming device, according to one embodiment.

Referring now to the drawings, wherein like reference numerals denote like or corresponding parts throughout the drawings and, more particularly to FIGS. 1-10, there are shown various embodiments of system and methods for reducing network dependencies for streaming content.

The following disclosure describes a system and method for reducing network dependencies for streaming content in the context of a casino style regulated gaming environment such as a casino enterprise hosting thousands of gaming terminals. However, it is apparent that the present system and method is applicable outside of a regulated casino-style gaming environment without deviating from the scope of the present disclosure. It should be understood that the various embodiments of the present disclosure should not be deemed to be limited to this particular industry.

1. Monolithic Gaming Devices (Client Terminals) and Systems:

The following disclosure provides a general background directed to gaming devices (e.g., client terminals) in a casino environment. The gaming devices are configured to provide a player with an ability to wager upon, play, interact with, produce winning and losing outcomes, and cash out winnings without an access to live streaming content. The gaming device may be configured as a dumb device to locally process commands to control the display. The gaming device may also be further configured as a smart device to receive streaming content such as system delivered content from a streaming content server and route player inputs back to a streaming content server. Various embodiments of the present disclosure are directed toward gaming environments where the client gaming terminal may be a smart device or a dumb device.

FIG. 1 illustrates an exemplary gaming device, according to one embodiment. A gaming device 10 includes cabinet 12 providing an enclosure for the several components of the gaming device 10 and associated equipment. A primary game display 14 is mounted to the cabinet 12. The primary game display 14 may be a video display such as an LCD, plasma, OLED or other electronic display as are known in the art. The primary game display 14 may also be embodied as a combination of two or more electronic displays disposed in an adjacent overlapping or overlying arrangement or may be embodied as an electro-mechanical display such as a stepper-base slot machine or a combination of video and electro-mechanical displays as is known in the art. The primary game display 14 may be mounted to one or more of a door for the cabinet 12 or the cabinet chassis itself. The primary game display 14 is located to display game content (and if desired other content) to the player. For example, the game content may be base game outcomes presented by a plurality of video spinning reels displaying symbols the combinations of which define winning or losing outcomes, video Poker, Keno or other form of base casino wagering game as is known in the art.

While the following description of the various embodiments of the present disclosure is directed to video reel-spinning games, it should be understood that the present disclosure could be applied to other games including those mentioned above as well. Features such as bonus/feature games including the type described herein may also be presented at the primary game display 14 as hereinafter described. The foregoing description should not be deemed as limiting the content (graphics, video or text) which can be displayed at the primary game display 14. Touch screen input functionality may be associated with the primary game display 14 to enable the player to interact with the video content such as the game.

The gaming device 10 also includes, in one or more embodiments, a top box 16 that may support a printed back-lit glass (not shown) as is known in the art depicting the rules, an award schedule, attract graphics, or it may support a secondary game display 18 that may be of one of the types described above with reference to the primary game display 14. The top box 16 may also support a backlit glass with graphics defining a marquee 19 and a topper 21 including additional graphics. These video displays such as the primary display 14 and secondary display 18 may be standard 17 or 19 inch CRT or flat panel video displays.

While the gaming device 10 described above includes only two video displays it should be understood that some gaming devices have three or more. For example, the topper 21 could include or be replaced by a third video display.

To enable a player to provide input to the controller for the gaming device 10 a plurality of buttons 20 may be provided on a button deck 22 for the gaming device 10. Additionally and alternatively, one or both of the primary game display 14 and secondary game display 18 may include touch screen input interface(s) as are known in the art. Typically, the primary game display 14 is positioned nearer the player and in a position for player touch interaction, only the primary display 14 has touch screen functionality.

Video content for display at the primary and secondary displays 14, 18 is crafted by designers to be adapted for display at one or more of the displays. For example, a video spinning a real slot machine game and bonus and secondary features are designed to be displayed solely at the primary game display 14 for play and interaction by the player. Meters (credit and win meters) are also typically displayed at the primary display 14 as well as other icons such as a "Help Screen" call-up icon and touch enabled icons to, for example, select pay lines to play and wagers per selected pay line. Video content for the secondary display 18 may include, by way of example only, video content to identify the game, animated of video content to attract players to the game, the game pay table (as well as highlighting wins on the pay table as they occur), progressive jackpot information or the like. It has been known to, in features triggered from the base game, simultaneously display cooperative video content on both of the primary and secondary displays 14, 18. It should be understood that for gaming devices 10, for the most part, the video content for the primary and secondary displays 14, 18 is related (since there is a common game theme presentation) but is different.

Buttons, selections or inputs are displayed at the primary game displays 14 and the player touching those icons or designated areas provides the required or desired input to configure and play the gaming device 10. The buttons 20 may be displayed and defined at a touch screen button panel interface of the type described in Kelly et al U.S. Pub. 2010/0113140A1 filed Nov. 16, 2009 and titled "Gesture Enhanced Input Device," the disclosure of which is incorporated herein. The touch screen button panel includes its video display that is smaller than the primary game display 14.

Other peripherals or associated equipment for the gaming device 10 include a bill/voucher acceptor 24 which reads and validates currency and vouchers for the player to establish credits for gaming on the gaming device 10 and one or more speakers 26 to provide audio to the player in association with the game play. To provide for communication between the gaming device 10 and a casino system, a player tracking module (PTM) 28 is mounted on the cabinet 12. PTM 28 has a PTM display 30 to display system related information to the player. The PTM display 30 may be a small LCD, plasma or OLED display with touch screen functionality. In an embodiment, the community games and features described herein are displayed at the PTM display 30; however, as set forth below these presentations are preferably migrated to areas at the primary or secondary displays 14, 18. A card reader 32 is provided to read a machine-readable component on a player loyalty card issued to the player to identify the player to the casino system as is known in the art. A ticket printer 36 may be provided as well on the PTM 28 or elsewhere on the gaming device 10 to provide printed value ticket vouchers to players as is known in the art.

Some functionality of the PTM 28 may be provided by a video switcher and touch router device as is described in U.S. Pub. App. 2009/0149253 entitled "Video Switcher and Touch Router Method for a Gaming Machine," filed Jan. 8, 2009, the disclosure of which is incorporated by reference. System and externally based content including the community game presentations, player information, advertisements features as described herein or other information may be displayed at areas at one or more of the primary or secondary displays 14, 18 dispensing with the need for the separate PTM display 30. According to the disclosure of U.S. Pub. App. 2009/0149253 when system content as well as an embodiment of the feature described herein are presented at the primary game display 14, the presentation of the base game played by the player is sized to share display real estate with the system content and/or feature as hereinafter described. The touch screen interface is also configured to interpret input "touches" from a player as relating to the base game content or the systems based content sharing the primary game display 14 real estate.

While the player may use the buttons 20 to prompt play of the game (or the touch screen input), alternatively the player may use a handle 34 to prompt an input as is known in the art.

Cabinet 12 may be a self-standing unit that is generally rectangular in shape and may be manufactured with reinforced steel or other rigid materials that are resistant to tampering and vandalism. Any shaped cabinet may be implemented with any embodiment of gaming device 10 so long as it provides access to a player for playing a game. For example, cabinet 12 may comprise a slant-top, bar-top, or a table-top style cabinet, including a Bally Cinevision™ or CineReels™ cabinet. The gaming device 10 may include a controller and memory disposed within the cabinet 12 or may have thin client capability such as that some of the computing capability is maintained at a remote server.

The plurality of player-activated buttons at the button deck 22 may be used for various functions such as, but not limited to, selecting a wager denomination, selecting a game to be played, selecting a wager amount per game, initiating a game, or cashing out money from gaming machine 10. Buttons may be operable as input mechanisms and may include mechanical buttons, electromechanical buttons or touch screen buttons. In one or more embodiments, buttons may be replaced with various other input mechanisms known in the art such as, but not limited to, touch screens, touch pad, track ball, mouse, switches, toggle switches, or other input means used to accept player input. For example, one input means is as disclosed in U.S. Pub. App. 2011/0111853, entitled "Universal Button Module," filed on Jan. 14, 2011 and/or U.S. Pub. App. 2010/0113140, entitled "Gesture Enhanced Input Device," filed Nov. 16, 2009, which are hereby incorporated by reference. Player input may also be by providing touch screen functionality at the primary game display 14 and/or secondary game display 18.

The primary game display 14 is controlled to present at least one instance of a base game of chance wherein, after making a wager of value, a player receives one or more outcomes from a set of potential outcomes. For example, one such game of chance is a video slot machine game. Gaming machine 10 may present a video Keno game, a lottery game, a bingo game, a Class II bingo game, a roulette game, a craps game, a blackjack game, a mechanical or video representation of a wheel game or the like. The primary game display 14 may be controlled to present and play multiple instances of concurrent games.

According to the present disclosure, a progressive such as a standalone progressive, LAN progressive or system based progressive (WAN progressive) is provided. The software and processing for the progressive may be included in the game CPU and memory structure or may be provided by a separate progressive controller included in the gaming device 10 and communicating with the game CPU. Where the progressive is a WAN based progressive, as discussed below, the progressive controller may be included as a software module at one or more system servers. The progressive controller may be in communication with one or more displays such as the primary display 14 or a large display (not shown) associated with one or more groups of gaming machines. In an embodiment, the progressive controller could be incorporated into the software/firmware of the PTM 28 or other related processor controlled equipment. The progressive controller may act in concert with the game CPU to provide the features herein described. These features may also be provided, as suggested above, by the game CPU or by the progressive controller alone. Accordingly, the progressive controller includes a processor and data structure for performing the tasks and features recited herein.

Figure 2A:
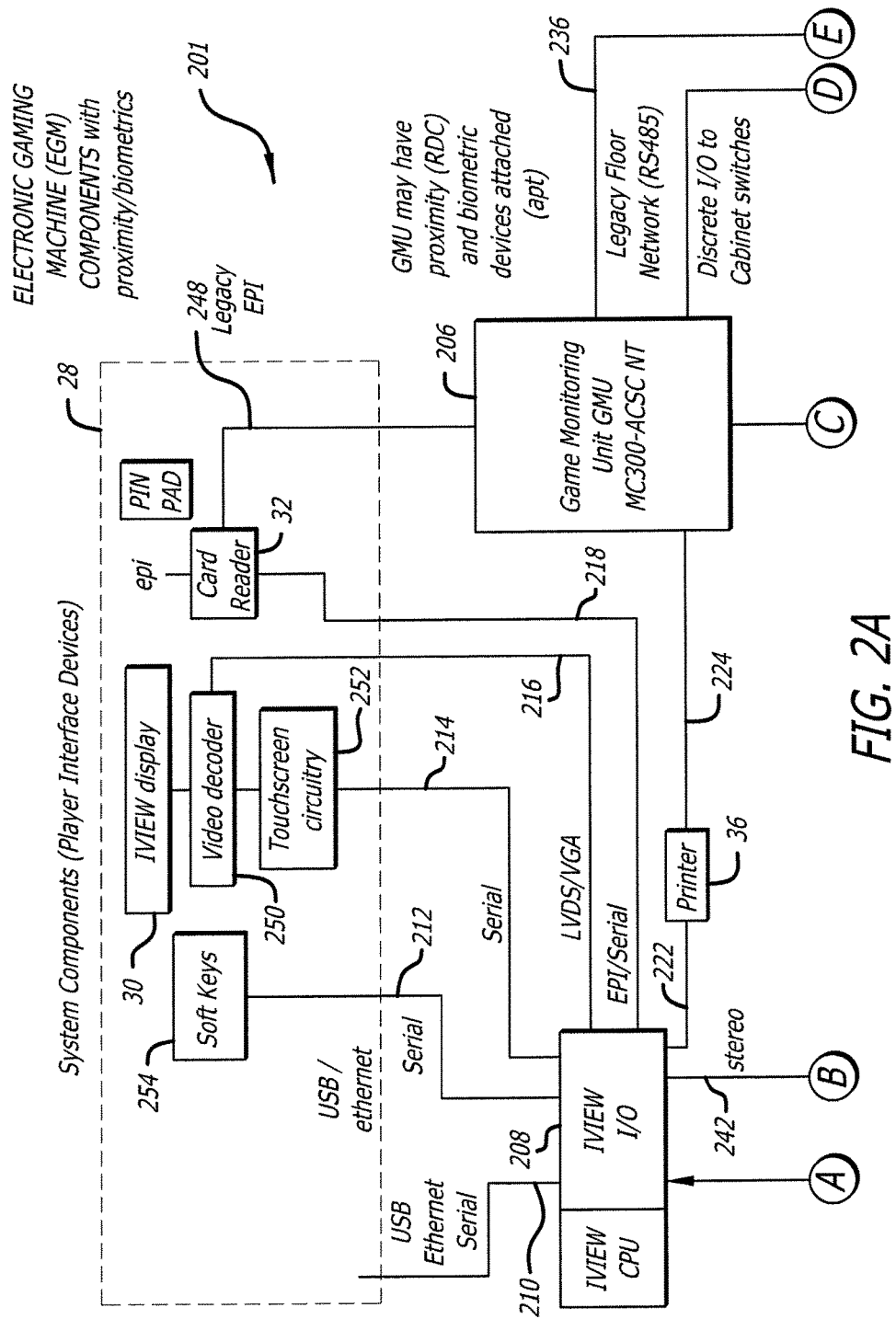
FIGS. 2A-2B illustrate an example of a gaming device operational platform and components for a gaming terminal of the type of the present disclosure.
Figure 2B:
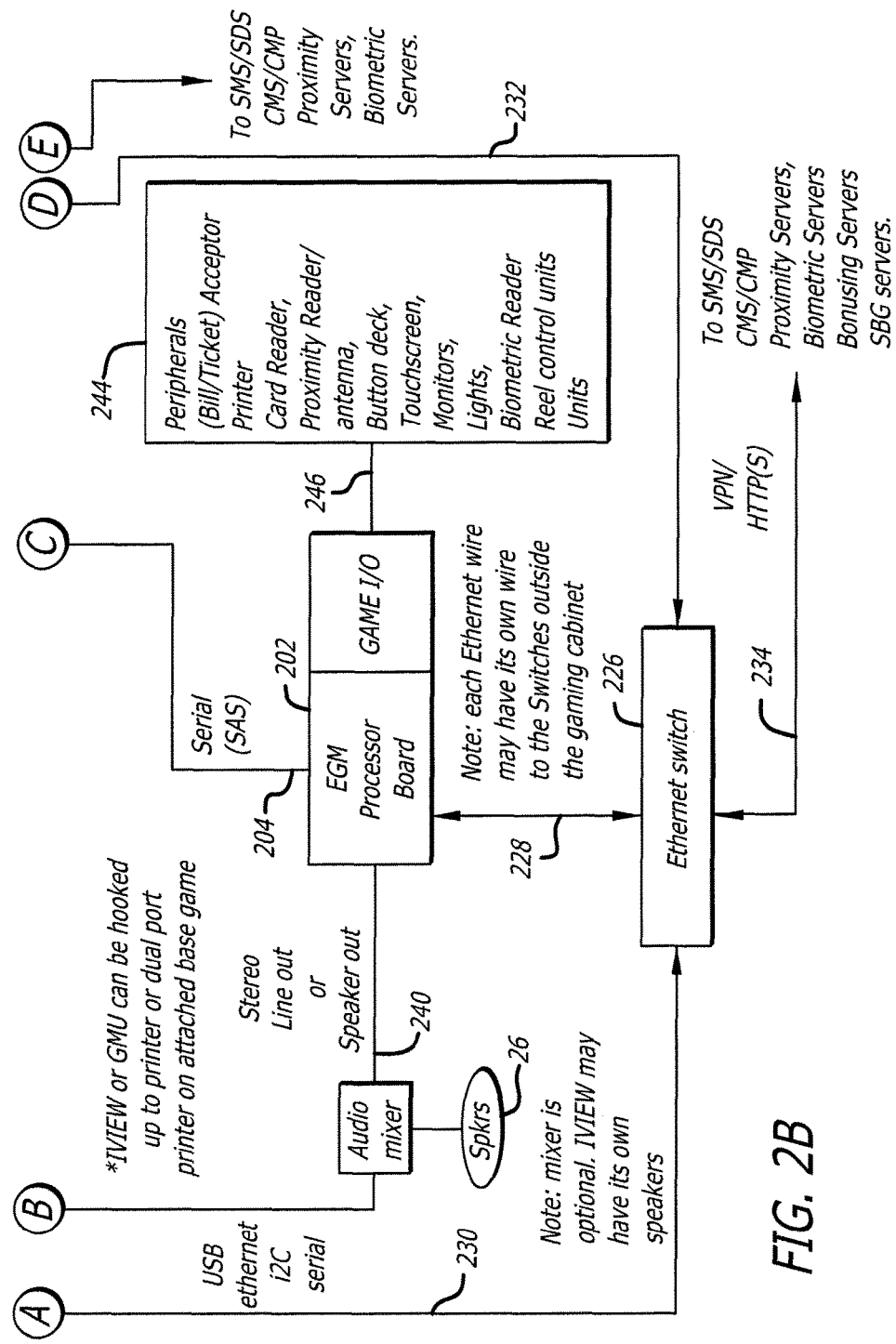

Referring to FIGS. 2A and 2B, the hardware 200 of the gaming device 10 for the controller(s) is shown in accordance with one or more embodiments. The hardware 200 includes game processor board 202 (electronic gaming machine (EGM) processor board, herein also referred to as game CPU or game processor) connected through serial bus line 204 to game monitoring unit (GMU) 206 (e.g., Bally MC300 or ACSC NT manufactured and sold by Bally Gaming, Inc., Las Vegas, Nev.), and player interface board (PIB) 208 including a CPU and an input-output device connected to the player tracking module (PTM) 28 over bus lines 210, 212, 214, 216, and 218. The game processor board 202 includes one or more processors and memory devices for the control of inputs and outputs to operate the game. At least one processor is configured to access one or more memory devices to control the video content displayed at the one or more displays such as the primary and secondary displays 14, 18.

The PTM 28 provides for communication between one or more gaming devices 10 and the casino system such as the type as hereinafter described. Inasmuch as gaming devices 10 may be manufactured by different entities, mounting like PTMs 28 at each gaming device 10 provides for communication to the system in one or more common message protocols. Typically when a casino enterprise purchases a casino management system, they also purchase the same manufacturer's PTMs 28 and video switcher and touch router such as a DM (Display Manager) device or the type sold by Bally Gaming, Inc. of Las Vegas, Nev. that are installed by the various manufacturers of the gaming devices 10 before delivery. In this manner, the mountings for the PTMs 28 on the gaming devices can be configured for location and esthetic appearance. Gaming voucher ticket printer 36 (for printing player cash out tickets) is connected to PIB 208 and GMU 206 over bus lines 222, 224. EGM Processor Board 202, CPU 202, and GMU 206 connect to Ethernet switch 226 over bus lines 228, 230, 232. Ethernet switch 226 connects to a slot management system and a casino management system (SMS, SDS, CMS and CMP) (FIGS. 4A, 4B) network over bus line 234. Ethernet switch 226 may also connect to a server based gaming server or a downloadable gaming server. GMU 206 also may connect to the network over bus line 236. Speakers 26 to produce sounds related to the game or according to the present disclosure connect through audio mixer and bus lines 240, 242 to EGM processor board 202 and PIB 208.

Peripherals 244 connect through bus 246 to EGM Processor Board 202. The peripherals 244 include, but are not limited to the following and may include individual processing capability: bill/voucher acceptor 24 to validate and accept currency and ticket vouchers, the player interfaces such as buttons 20. The peripherals 244 may include the primary game display 14, secondary game display 18 and other displays such as, for example, a tertiary video display or touch screen button panel video display as described above. The bill/voucher acceptor 24 is typically connected to the game input-output board of the EGM processing board 202 (which is, in turn, connected to a conventional central processing unit ("CPU") board), such as an Intel Pentium® microprocessor mounted on a gaming motherboard. The I/O board may be connected to CPU processor board by a serial connection such as RS-232 or USB or may be attached to the processor by a bus such as, but not limited to, an ISA bus. The I/O board and/or EGM processing board 202 include outputs for directing processed video content output to the correct display. Intervening graphics processing may also be included. Again these outputs are typically suitable wired connections. The gaming motherboard may be mounted with other conventional components, such as are found on conventional personal computer motherboards, and loaded with a game program which may include a gaming machine operating system (OS), such as a Bally Alpha OS. EGM processor board 202 executes a game program that causes the gaming device 10 to display at the plural displays and play a game. The various components and included devices may be installed with conventionally and/or commercially available components, devices, and circuitry into a conventional and/or commercially available gaming terminal cabinet 12.

When a player has inserted a form of currency such as, for example, and without limitation, paper currency, coins or tokens, cashless tickets or vouchers, electronic funds transfers or the like into the currency acceptor, a signal is sent by way of bus 246 to the I/O board and to EGM processor board 202 which, in turn, assigns an appropriate number of credits for play in accordance with the game program. The player may further control the operation of the gaming machine by way of other peripherals 244, for example, to select the amount to wager via the buttons 20. The game starts in response to the player operating a start mechanism such as the handle 34, button 20 such as a SPIN/RESET button or a touch screen icon. The game program includes a random number generator to provide and display randomly selected video indicia at the primary game display 14 as shown in FIG. 1. In some embodiments, the random generator may be physically separate from gaming device 10; for example, it may be part of a central determination host system which provides random game outcomes to the game program. Finally, EGM processor board 202 under control of the game program and OS compares the outcome to an award schedule. The set of possible game outcomes may include a subset of outcomes related to the triggering and play of a feature or bonus game. In the event the displayed outcome is a member of this subset, EGM processor board 202, under control of the game program and by way of I/O Board, may cause feature game play to be presented on the primary game display 14 and/or any legacy secondary display(s) 18.

Video content and predetermined payout amounts for certain outcomes, including feature game outcomes, are stored as part of the game program. Such payout amounts are, in response to instructions from processor board 202, provided to the player in the form of coins, credits or currency via I/O board and a pay mechanism, which may be one or more of a credit meter, a coin hopper, a voucher printer, an electronic funds transfer protocol or any other payout means known or developed in the art.

In various embodiments, game programs (including video content for the plural displays) are stored in a memory device (not shown) connected to or mounted on the gaming motherboard. By way of example, but not by limitation, such memory devices include external memory devices, hard drives, CD-ROMs, DVDs, and flash memory cards. The memory device includes game programs for at least a base game including any associated bonus games. In an embodiment, as described below, the memory may also include a feature program. In an alternative embodiment, the game programs are stored in a remote storage device. In an embodiment, the remote storage device is housed in a remote server such as a downloadable gaming server. The gaming device may access the remote storage device via a network connection, including but not limited to, a local area network connection, a TCP/IP connection, a wireless connection, or any other means for operatively networking components together. Optionally, other data including graphics, sound files and other media data for use with the gaming device are stored in the same or a separate memory device (not shown). Some or all of the game programs and its associated data may be loaded from one memory device into another, for example, from flash memory to random access memory (RAM).

In one or more embodiments, peripherals may be connected to the system over Ethernet connections directly to the appropriate server or tied to the system controller inside the gaming terminal using USB, serial or Ethernet connections. Each of the respective devices may have upgrades to their firmware utilizing these connections.

Game monitoring unit (GMU) 206 includes an integrated circuit board and GMU processor and memory including coding for network communications, such as the G2S (game-to-system) protocol from the Gaming Standards Association, Las Vegas, Nev., used for system communications over the network. As shown, GMU 206 may connect to the card reader 32 through bus 248 and may thereby obtain player information and transmit the information over the network through bus 236. Gaming activity information may be transferred by the EGM processor board 202 to GMU 206 where the information may be translated into a network protocol, such as S2S, for transmission to a server, such as a player tracking server, where information about a player's playing activity may be stored in a designated server database.

PIB 208 includes an integrated circuit board, a PIB processor, and a memory. The memory includes an operating system, such as Windows CE, a player interface program that may be executable by the PIB processor, various input/output (I/O) drivers for respective devices that connect to PIB 208, such as player tracking module 28. The memory may further include various games or game components playable on PIB 208 or playable on a connected network server, and PIB 208 is operable as a player interface. PIB 208 connects to card reader 32 through bus 218, player tracking display 30 through video decoder 250 and bus 216, such as an LVDS or VGA bus.

As part of its programming, the PIB processor executes coding to drive player tracking display 30 and provide messages and information to a player. Touch screen circuitry 252 interactively connects PTM display 30 and video decoder 250 to PIB 208 such that a player may input information and causes the information to be transmitted to PIB 208 either on the player's initiative or responsive to a query by PIB 208. Additionally, soft keys 254 connect through bus 212 to PIB 208 and operate together with the player tracking display 30 to provide information or queries to a player and receive responses or queries from the player. PIB 208, in turn, communicates over the CMS/SMS network through Ethernet switch 226 and busses 230, 234 and with respective servers, such as a player tracking server.

PTMs 28 are linked into the virtual private network of the system components in gaming device 10. The system components include the player tacking module 28 (e.g., Bally iVIEW® device, iVIEW is a registered trademark of Bally Gaming, Inc.) processing board 202 and game monitoring unit (GMU) processing board 202. These system components may connect over a network to the slot management system (such as a commercially available Bally SDS/SMS) and/or casino management system (such as a commercially available Bally CMP/CMS).

The GMU 206 system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to installation on the system components.

The system components include the PTM 28 processing board and game monitoring unit (GMU) 206. The GMU 206 and PTM 28 can be combined into one like the commercially available Bally GTM iVIEW device. This device may have a video mixing technology to mix the EGM processor's video signals with the iVIEW display onto the top box monitor or any monitor on the gaming device.

The PTM 28 may also interface with a switcher and router device of the type described in U.S. Pub. App. 2009/0149253, entitled "Video Switcher and Touch Router Method for a Gaming Machine," filed Jan. 8, 2009, and hereby incorporated by reference. Instead of providing the PTM display 30, the switcher and router device (e.g., DM) provides for the content normally displayed at the PTM display 30 to be displayed at shared display real estate with one or more of the primary or secondary displays 14, 18.

Figure 3:
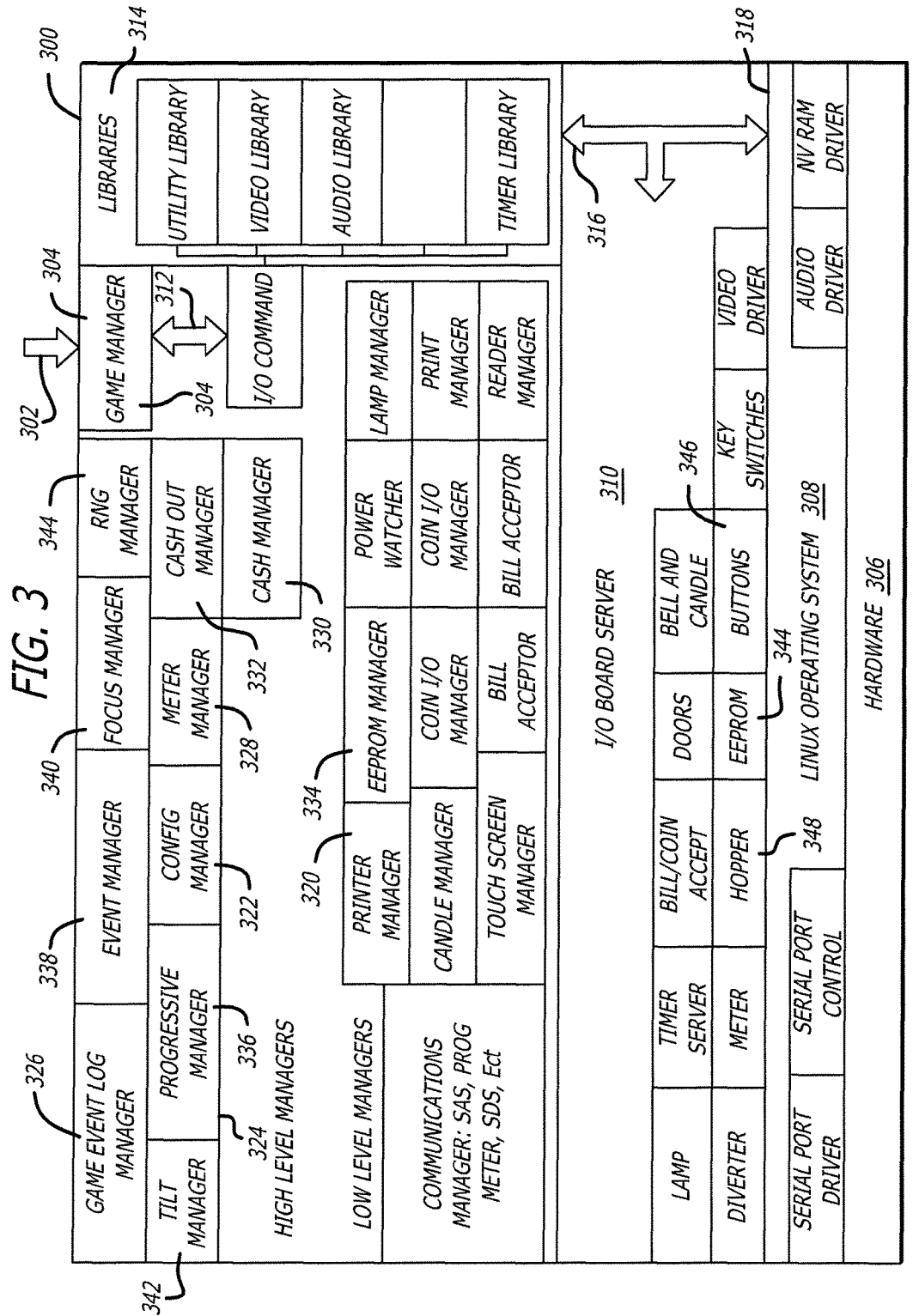
FIG. 3 is a block diagram of the logical components of a gaming kernel for a gaming device.

In accordance with one or more embodiments, FIG. 3 is a functional block diagram of a gaming kernel 300 of a game program under control of gaming terminal processor board 202. The game program uses gaming kernel 300 by calling into application programming interface (API) 302, which is part of game manager 304. The components of game kernel 300 as shown in FIG. 3 are only illustrative, and should not be considered limiting. For example, the number of managers may be changed, additional managers may be added or some managers may be removed without deviating from the scope and spirit of the present disclosure.

As shown in the example, there are three layers: a hardware layer 306; an operating system layer 308, such as, but not limited to, Linux; and a game kernel layer having game manager 304 therein. In one or more embodiments, the use of an operating system layer 308, such as a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel 300 executes at the user level of the operating system layer 308, and itself contains a major component called the I/O board server 310. To properly set the bounds of game application software (making integrity checking easier), all game applications interact with gaming kernel 300 using a single API 302 in game manager 304. This enables game applications to make use of a well-defined, consistent interface, as well as making access points to gaming kernel 300 controlled, where overall access is controlled using separate processes.

For example, game manager 304 parses an incoming command stream and, when a command dealing with I/O comes in (arrow 312), the command is sent to an applicable library routine 314. Library routine 314 decides what it needs from a device, and sends commands to I/O board server 310 (see arrow 316). A few specific drivers remain in operating system layer 308's kernel, shown as those below line 318. These are built-in, primitive, or privileged drivers that are (i) general (ii) kept to a minimum and (iii) are easier to leave than extract. In such cases, the low-level communications is handled within operating system layer 308 and the contents passed to library routines 314.

Thus, in a few cases library routines may interact with drivers inside operating system layer 308, which is why arrow 316 is shown as having three directions (between library routines 314 and I/O board server 310, or between library routines 314 and certain drivers in operating system layer 308). No matter which path is taken, the logic needed to work with each device is coded into modules in the user layer of the diagram. Operating board server 310 layer is kept as simple, stripped down, and common across as many hardware platforms as possible. The library utilities and user-level drivers change as dictated by the game cabinet or game machine in which it will run. Thus, each game cabinet or game machine may have an industry standard EGM processing board 202 connected to a unique, relatively dumb, and as inexpensive as possible I/O adapter board, plus a gaming kernel 300 which will have the game-machine-unique library routines and I/O board server 310 components needed to enable game applications to interact with the gaming machine cabinet. Note that these differences are invisible to the game application software with the exception of certain functional differences (i.e., if a gaming cabinet has stereo sound, the game application will be able make use of API 302 to use the capability over that of a cabinet having traditional monaural sound).

Game manager 304 provides an interface into game kernel 300, providing consistent, predictable, and backwards compatible calling methods, syntax, and capabilities by way of game application API 302. This enables the game developer to be free of dealing directly with the hardware, including the freedom to not have to deal with low-level drivers as well as the freedom to not have to program lower level managers 320, although lower level managers 320 may be accessible through game manager 304's interface if a programmer has the need. In addition to the freedom derived from not having to deal with the hardware level drivers and the freedom of having consistent, callable, object-oriented interfaces to software managers of those components (drivers), game manager 304 provides access to a set of upper level managers 324 also having the advantages of consistent callable, object-oriented interfaces, and further providing the types and kinds of base functionality required in casino-type games. Game manager 304, providing all the advantages of its consistent and richly functional game application API 302 as supported by the rest of game kernel 300, thus provides a game developer with a multitude of advantages.

Game manager 304 may have several objects within itself, including an initialization object (not shown). The initialization object performs the initialization of the entire game machine, including other objects, after game manager 304 has started its internal objects and servers in appropriate order. In order to carry out this function, the kernel's configuration manager 322 is among the first objects to be started; configuration manager 322 has data needed to initialize and correctly configure other objects or servers.

The upper level managers 324 of game kernel 300 may include game event log manager 326 which provides, at the least, a logging or logger base class, enabling other logging objects to be derived from this base object. The logger object is a generic logger; that is, it is not aware of the contents of logged messages and events. The game event log manager's 326 job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 328 manages the various meters embodied in the game kernel 300. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 328 receives its initialization data for the meters, during start-up, from configuration manager 322. While running, the cash in manager 330 and cash out manager 332 call the meter manager's 328 update functions to update the meters. Meter manager 328 will, on occasion, create backup copies of the soft meters by storing the soft meters' readings in EEPROM. This is accomplished by calling and using EEPROM manager 334.

In accordance with still other embodiments, progressive manager 336 manages progressive games playable from the game machine. Thus, where the progressive is a WAN-based progressive the progressive controller may be incorporated into the progressive manager 336. Event manager 338 is generic, like game event log manager 326, and is used to manage various gaming machine events. Focus manager 340 correlates which process has control of various focus items. Tilt manager 342 is an object that receives a list of errors (if any) from configuration manager 322 at initialization, and during game play from processes, managers, drivers, etc. that may generate errors. Random number generator manager 344 is provided to allow easy programming access to a random number generator (RNG), as a RNG is required in virtually all casino-style (gambling) games. Random number generator manager 344 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 332 has the responsibility of configuring and managing monetary output devices. During initialization, cash out manager 332, using data from configuration manager 322, sets the cash out devices correctly and selects any selectable cash out denominations. During play, a game application may post a cash out event through the event manager 338 (the same way all events are handled), and using a call back posted by cash out manager 332, cash out manager 332 is informed of the event. Cash out manager 332 updates the credit object, updates its state in non-volatile memory, and sends an appropriate control message to the device manager that corresponds to the dispensing device. As the device dispenses dispensable media, there will typically be event messages being sent back and forth between the device and cash out manager 332 until the dispensing finishes, after which cash out manager 332, having updated the credit manager and any other game state (such as some associated with meter manager 328) that needs to be updated for this set of actions, sends a cash out completion event to event manager 338 and to the game application thereby. Cash in manager 330 functions similarly to cash out manager 332, only controlling, interfacing with, and taking care of actions associated with cashing in events, cash in devices, and associated meters and crediting.

In a further example, in accordance with one or more embodiments, I/O board server 310 may write data to the gaming machine EEPROM memory, which is located in the gaming machine cabinet and holds meter storage that must be kept even in the event of power failure. Game manager 304 calls the I/O library functions to write data to the EEPROM. The I/O board server 310 receives the request and starts a low priority EEPROM manager 334 thread within I/O board server 310 to write the data. This thread uses a sequence of 8 bit command and data writes to the EEPROM device to write the appropriate data in the proper location within the device. Any errors detected will be sent as IPC messages to game manager 304. All of this processing is asynchronous.

In accordance with one embodiment, button module 346 within I/O board server 310, polls (or is sent) the state of buttons every 2 ms. These inputs are debounced by keeping a history of input samples. Certain sequences of samples are required to detect a button was pressed, in which case the I/O board server 310 sends an inter-process communication event to game manager 304 that a button was pressed or released. In some embodiments, the gaming machine may have intelligent distributed I/O which debounces the buttons, in which case button module 346 may be able to communicate with the remote intelligent button processor to get the button events and simply relay them to game manager 304 via IPC messages. In still another embodiment, the I/O library may be used for pay out requests from the game application. For example, hopper module 348 must start the hopper motor, constantly monitor the coin sensing lines of the hopper, debounce them, and send an IPC message to the game manager 304 when each coin is paid.

Further details, including disclosure of lower level fault handling and/or processing, are included in U.S. Pat. No. 7,351,151, issued Apr. 1, 2008, entitled "Gaming Board Set and Gaming Kernel for Game Cabinets," the disclosure of which is hereby incorporated by reference.

The above description is directed to a gaming device 10 having a monolithic (i.e. standalone) architecture. Where the gaming device 10 is a client terminal configured to provide content and player input in a "streaming" environment the gaming terminal may include limited processing and memory (e.g. is a "dumb" client) inasmuch as data representing the outcome selection and rendering is streamed from a host server to the gaming client terminal. The inputs from the player by the various buttons are sent to the host server for the interactive play of the game. Thus, even the dumb client includes player input devices, one or more video displays, card reader, cash validator and ticket printer of the type described above. However the structures and functions described above in reference to the monolithic gaming device 10 may not include the random number generator or other components inasmuch as the content is selected at the host and is streamed to the client gaming terminal.

Figure 4A:
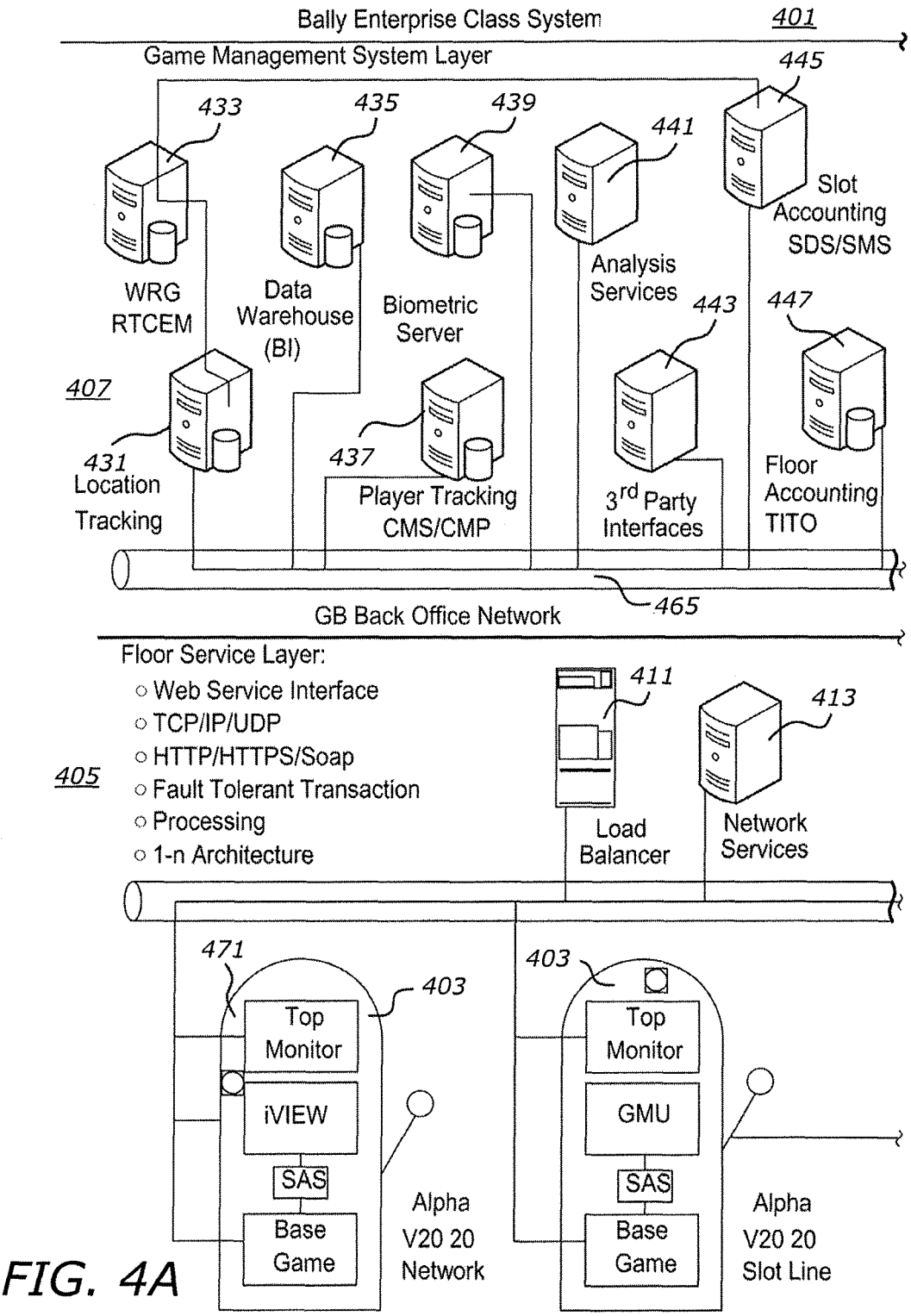
FIGS. 4A and 4B is a schematic of an example of a casino enterprise network incorporating gaming devices.
Figure 4B:
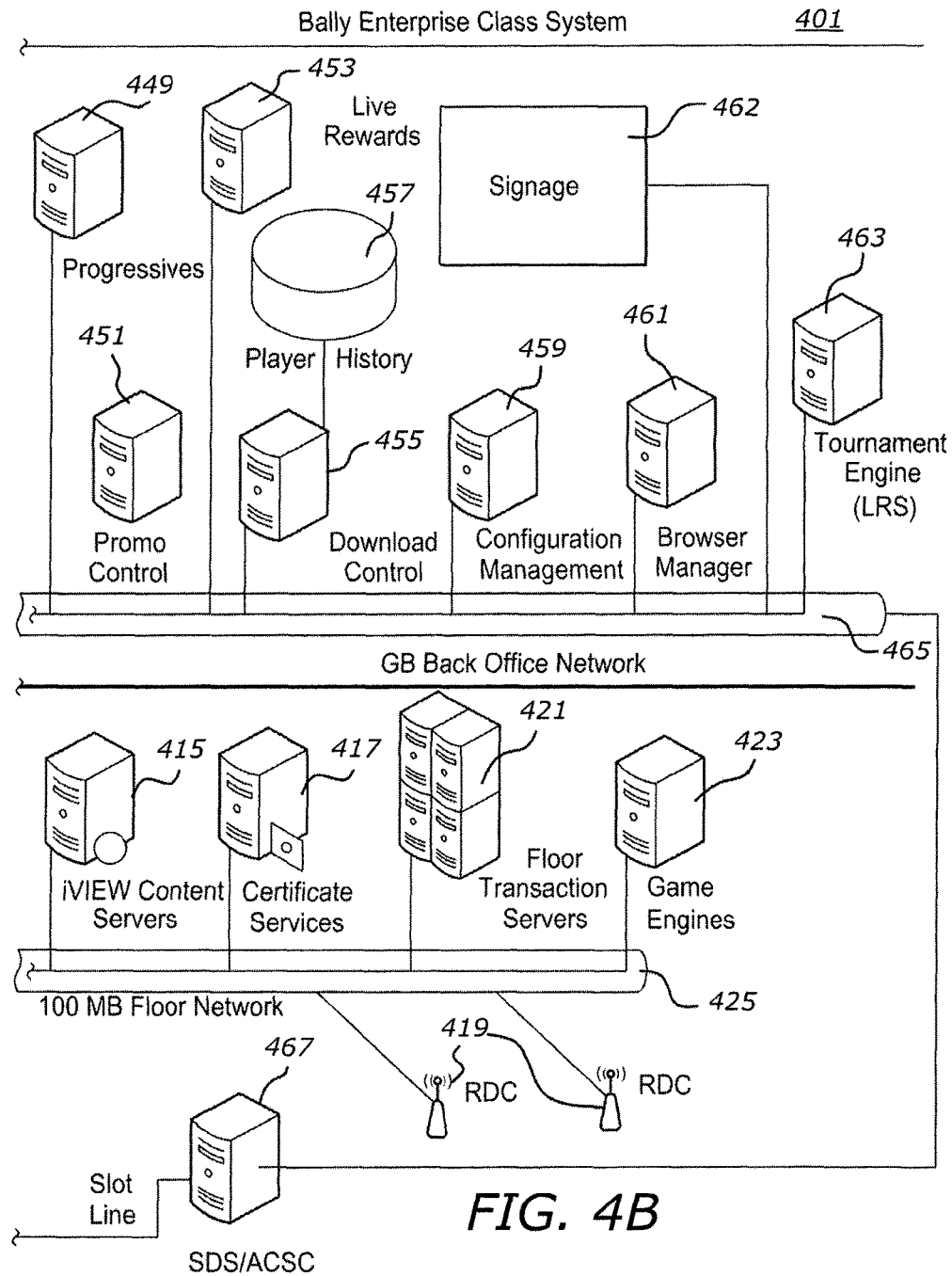

Referring to FIGS. 4A and 4B, an example of a gaming system 401 is shown in accordance with one or more embodiments. Gaming system 401 may include one casino or multiple locations (herein referred to collectively as a casino enterprise) and generally includes a network of gaming devices 403 (including gaming devices 10 of the type as described in FIG. 1), floor management system (SMS) 405, and casino management system (CMS) 407. SMS 405 may include load balancer 411, network services server 413, player tracking module (28 of FIG. 1), iView (PTM) content servers 415, certificate services server 417, floor radio dispatch receiver/transmitters (RDC) 419, floor transaction servers 421 and game engines 423 (where the gaming devices 403 operate server based or downloadable games), each of which may connect over network bus 425 to gaming devices 403. CMS 407 may include location tracking server 431, WRG RTCEM (William Ryan Group Real Time Customer Experience Management from William Ryan Group, Inc. of Sea Girt, N.J.) server 433, data warehouse server 435, player tracking server 437, biometric server 439, analysis services server 441, third party interface server 443, slot accounting server 445, floor accounting server 447, progressives server 449, promo control server 451, bonus game (such as Bally Live Rewards) server 453, download control server 455, player history database 457, configuration management server 459, browser manager 461, tournament engine server 463 connecting through bus 465 to server host 467 and gaming devices 403.

The various servers and gaming devices 403 may connect to the network with various conventional network connections (such as, for example, USB, serial, parallel, RS485, Ethernet). Additional servers which may be incorporated with CMS 407 include a responsible gaming limit server (not shown), advertisement server (not shown), and a control station server (not shown) where an operator or authorized personnel may select options and input new programming to adjust each of the respective servers and gaming devices 403. SMS 405 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

The gaming devices 403 include various peripheral components that may be connected with USB, serial, parallel, RS-485 or Ethernet devices/architectures to the system components within the respective gaming machine. The GMU (shown as GMU 206 in FIG. 2A) has a connection to the base game through a serial SAS connection. The system components in the gaming cabinet may be connected to the servers using HTTPs or G2S protocols over Ethernet. Using CMS 407 and/or SMS 405 servers and devices, firmware, media, operating systems, and configurations may be downloaded to the system components of respective gaming devices for upgrading or managing floor content and offerings in accordance with operator selections or automatically depending upon CMS 407 and SMS 405 master programming. The data and programming updates to gaming devices 403 are authenticated using conventional techniques prior to install on the system components.

In various embodiments, any of the gaming devices 403 may be a mechanical reel spinning slot machine, video slot machine, video poker machine, video Bingo machine, Keno machine, or a gaming device offering one or more of the above described games including an interactive wheel feature. Alternately, gaming devices 403 may provide a game with an accumulation-style feature game as one of a set of multiple primary games selected for play by a random number generator, as described above. A gaming system 401 of the type described above also allows a plurality of games in accordance with the various embodiments of the present disclosure to be linked under the control of a group game server (not shown) for cooperative or competitive play in a particular area, carousel, casino or between casinos located in geographically separate areas. For example, one or more examples of group games under control of a group game server are disclosed in U.S. Published Application 2008/0139305, entitled "Networked System and Method for Group Gaming," filed on Nov. 9, 2007, which is hereby incorporated by reference in its entirety for all purposes.

The gaming system 401, among other functionalities such as slot accounting (i.e. monitoring the amount wagered ("drop"), awards paid) and other casino services, includes the player tracking CMS/CMP server 437 and/or data warehouse 435 storing player account data. This data includes personal data for players enrolled in the casino players club sometimes referred to as a loyalty club. An example of the personal data is the player's name, address, SSN, birth date, spouse's name and perhaps personal preferences such as types of games, preferences regarding promotions, player rating level, available player comp points (points accumulated based upon commercial "spend" activity with the enterprise including gaming and which may be redeemed or converted into cash or merchandise) and the like. As is known in the industry and according to the prior art, at enrollment the player is assigned a created account in the player tracking CMS/CMP server 437 and is issued a player tracking card having a machine readable magnetic stripe.

The system 401 may also include electronic transfer of funds functionality. For example, a player having accumulated $100 at a gaming terminal 10 may decide to "cash out" to play another gaming terminal 10. The player, for example, using the PTM (e.g., 28 of FIG. 1) to initiate communication with the system 401, for example, server 437 to upload the value from the gaming terminal 10 into an electronic account associated with the player's account. The player may choose to upload all or a portion of the funds the player's established electronic account. The system would prompt the player to enter their PIN (or obtain biometrical confirmation as to the player's identity) and upload the chosen amount to their account. When the player moves to another gaming terminal 10, he/she inserts their player loyalty card into a card reader to access their account. A prompt provides for the player to request funds from their account. Entering their PIN (or biometric identifier) the player can input the desired amount that is downloaded to their gaming terminal 10 for play.

Figure 5:
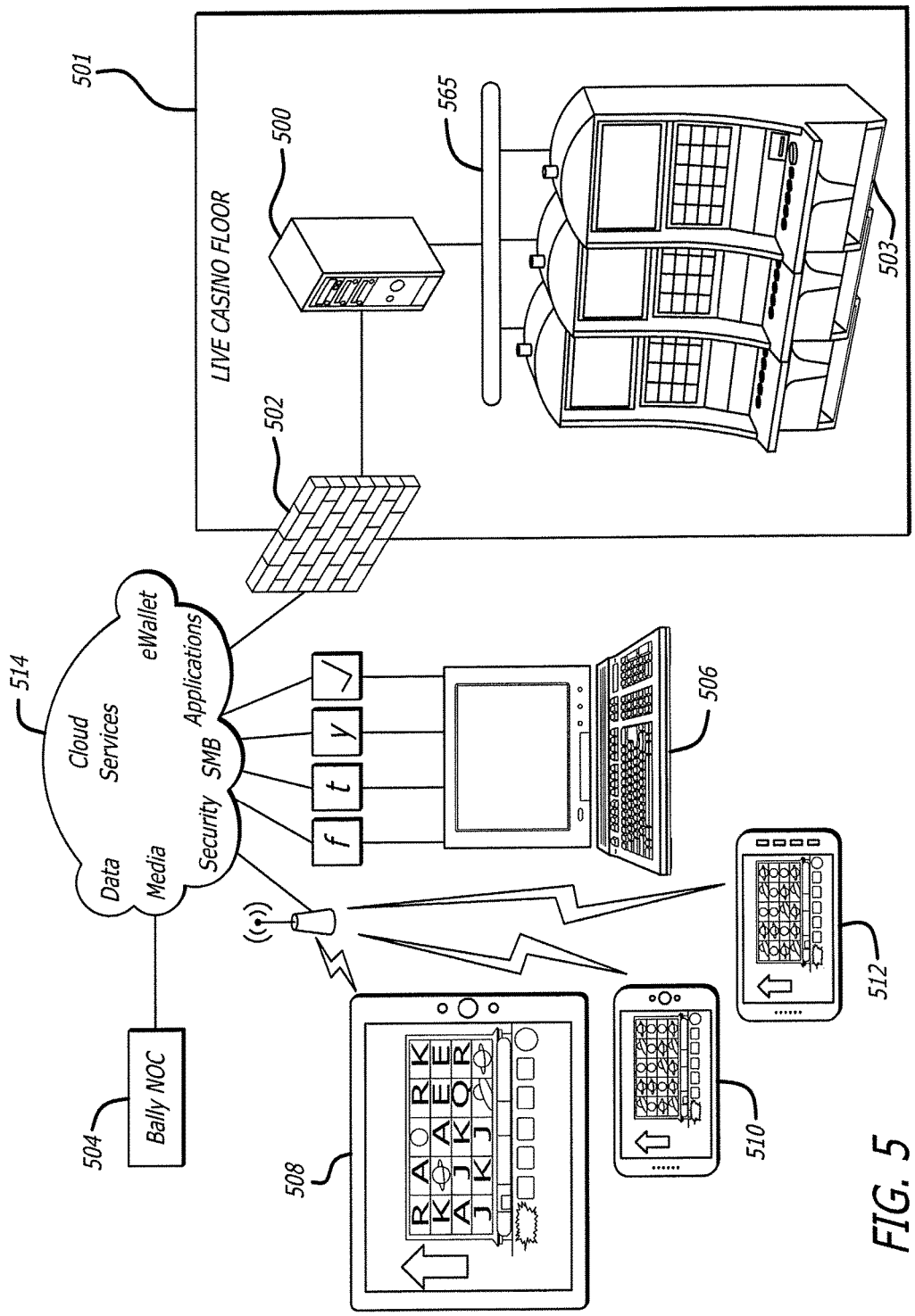
FIG. 5 is a diagram showing an example of an architecture for tying a casino enterprise network to an external provider of games and content to Internet or broadband communication capable devices.

The present disclosure may be implemented or promoted by or through a system as suggested in FIG. 5. A gaming enterprise system 501 may be hosted at a casino property enterprise, across several casino enterprises or by a third party host. As described above the gaming enterprise system 501 has a network communication bus 465 providing for communication between the gaming devices 10 and various servers as described above with respect to FIGS. 4A, 4B. To provide the functionality illustrated in FIG. 5, a feature server 500, such as a Bally Elite Bonusing Server, is connected to the network communication bus 465 for communication to the gaming system 401, the gaming devices 10 and the various servers and other devices as described above. Through a secure network firewall 502 the feature server 500 is in communication with a cloud computing/storage service 514 which may be hosted by the casino enterprise, a licensed third party or if permitted by gaming regulators an unlicensed provider. For example, the cloud service 514 may be as provided by Microsoft® Private Cloud Solutions offered by Microsoft Corp. of Redmond, Wash., USA.

The cloud service 514 provides various applications which can be accessed and delivered to, for example, personal computers 506, portable computing devices such as computer tablets 508, personal digital assistants (PDAs) 510 and cellular devices such as telephones and smart phones 512. For example, the cloud service 514 may provide and support the enterprise applications in association with the feature server 500. The cloud service 513 may also facilitate the delivery of content to user/players by supporting updates and advertising through the enterprise applications to the remote device user/player. The cloud service 514 includes security provided for secure communication with the cloud service 514 between the player/users and the cloud service 514 and between the cloud service 514 and the gaming enterprise system 501. Security applications may be through encryption, the use of personal identification numbers (PINS), biometric identification, location determination or other devices and systems. As suggested in FIG. 5 the cloud service 515 stores or accesses player/user data retrieved from players/users and from the gaming enterprise system 501 and feature server 500.

The players/users may access the cloud service 514 and the applications and data provided thereby through the Internet or through broadband wireless cellular communication systems and any intervening sort range wireless communication such as Wi-Fi. The players/users may access the applications and data through various social media offerings such as Facebook, Twitter, Yelp, MySpace or LinkedIn or the like.

The cloud service 514 may also host game applications to provide virtual instances of games and features, such as described herein, for free, promotional, or where permitted, P2P (Pay to Play) supported gaming. Third party developers may also have access to placing applications with the cloud service 514 through, for example, a national operations center (Bally NOC 504). A game software manufacturer such as Bally Gaming, Inc. may also provide game applications on its own or on behalf of the casino enterprise.

Other media such as advertising, notices (such as an upcoming tournament) promotions and surveys may also be provided to and through the cloud service 514. When a player/user accesses the cloud service 514 certain media may be delivered to the player/user in a manner formatted for their application and device.

The cloud service 514 enables the casino enterprise to provide base games and features and to market to and foster player loyalty. To drive such interaction various incentive programs may be employed including, as described above, users earning or being awarded mystery game chances that may be redeemed at their next visit to the casino enterprise or, where permitted, during play on their remote devices.

2. Reducing Network Dependencies for Streaming Content:

The present system and method provides live migration of virtual machines to lessen or remove dependence on network infrastructure by overcoming the downtime limitation of live migration. In particular, the present system and method provides support for live migration of GPU-enabled applications such as gaming software.

Figure 6:
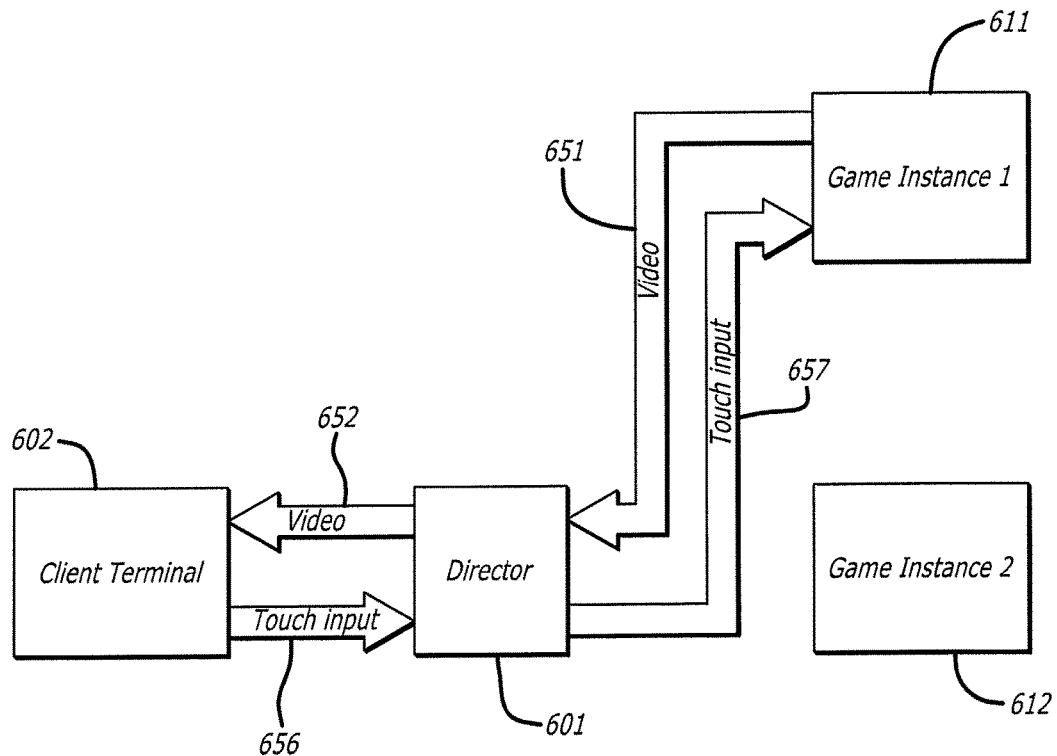
FIG. 6 is a block diagram of a streaming architecture including a director module, according to some embodiments.

FIG. 6 is a block diagram of a streaming architecture including a director module, according to some embodiments. The client terminal 602 may be located at a single property or located at multiple locations. According to some embodiments, the gaming devices are dumb client terminals, and the client terminal 602 may represent multiple client terminals. One or more host servers may be configured for streaming content such as game content to the client terminal 602. At least one host server is designated as a streaming host server. Preferably, the host streaming server is configured to host a plurality of virtual machines ("VMs"). Each virtual machine is configured to operate an instance (e.g., game instances 611, 612, game menu instance 613) of a game for play. Each VM may operate on an operating system compatible with the corresponding game instance. For example, one VM may operate on one operating system and another VM may operate on another operating system. In some embodiments, a host server concurrently hosts sixteen VMs to provide a plurality of different games. Logically associated with each subset of the client terminals is a local streaming server also configured to include VMs. A network provides communication among the host server, local server(s) and client terminals. The host server provides streaming content to the client terminals. A director module 601 controls streaming and operation of the networked devices including the client terminal 602. For example, a client terminal 602 may be in communication with a VM at the host server running an interactive video Poker game P. Graphics and content is streamed to the client terminal 602 to display the game via communication paths 651 and 652, and player inputs are routed to the appropriate VM operating the game P via the communication paths 656 and 657.

In a background thread, the director module 601 controls the host server to download/stream to a VM at the local server associated with the local streaming server. The local server VM is also configured to operate the game P being played by the player at the client terminal 602 including meters and preferences such as speed of play, display preferences, and the like. Where the local server has a VM already configured to operate game P, the director module 601 may control the host server to download/stream only content and preferences required to create a clone of the game P being streamed to the client terminal 602. Once the local server VM has the cloned game P and preferences at a predetermined event the director module 601, the host server or the client terminal 602, alone or in combination, switch(es) the streaming content from the host server VM and migrate(s) play of the game P to the game instance of the local server VM. If the host network fails, the local network between the local server and client terminal 602 continues to stream content and receive inputs for the play of the game.

The director module 601 is interposed between a client terminal 602 and servers. In a typical streaming architecture, the client terminal 602 simply decodes compressed audio/video streams to a collection of LCD displays, and reads input such as touchscreen, passing it back to the servers. The audio and video streams (shown as video in FIG. 6 for simplification) and input data pass through the director module 601. VMs are dedicated to providing game menu applications and/or system-based content such as player tracking. The director module 601 controls the assignment of stream content to the client terminal 602, and also moves instances under live migration from one physical host to another.

The client terminal 602 is playing the game from game instance 1. If a player selects the game selection menu, the player's input command is intercepted by the director module 601 to change the audio/video and input streams to be assigned to game menu instance 1.

Figure 7:
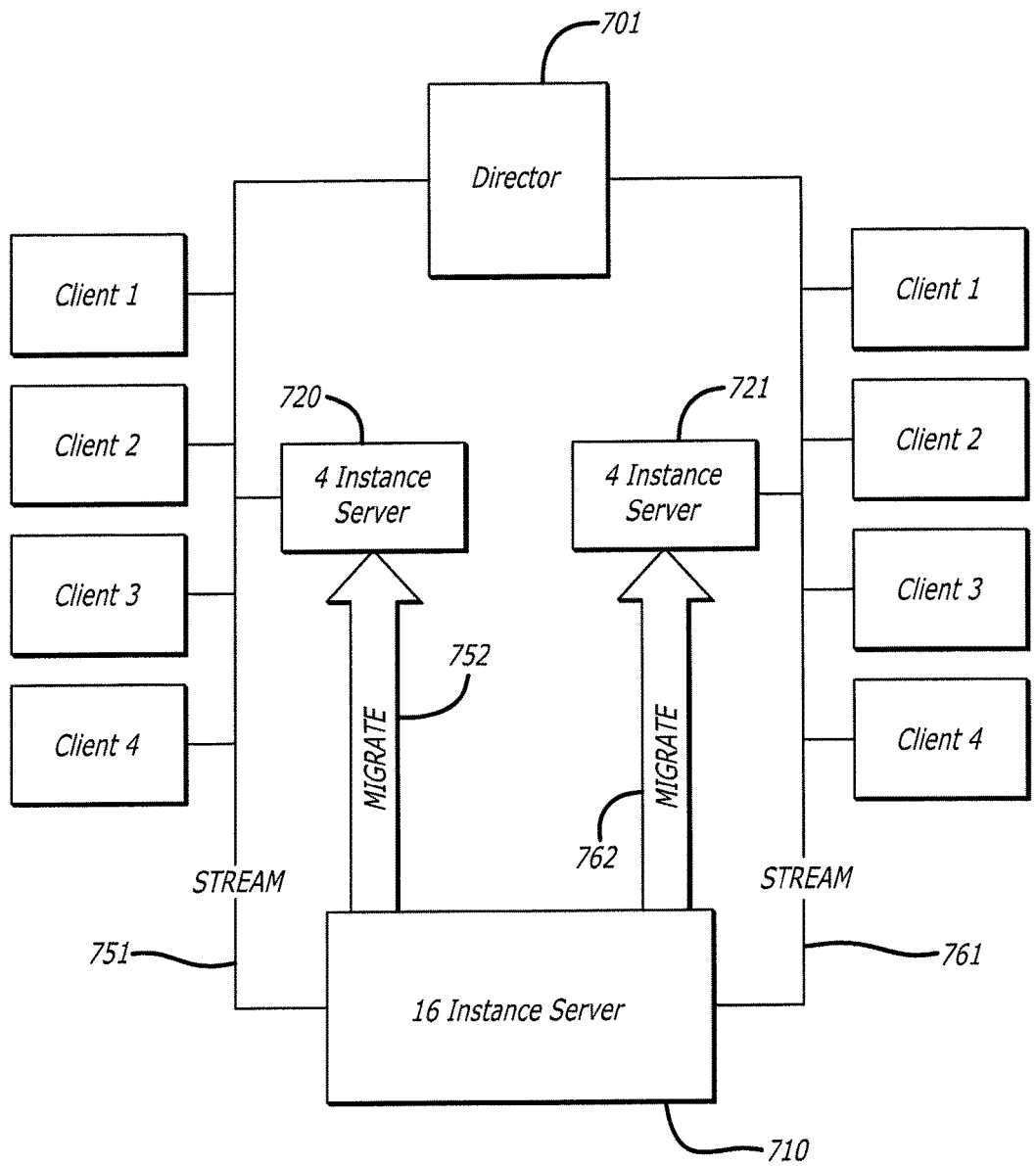
FIG. 7 illustrates an exemplary live migration architecture, according to one embodiment.

FIG. 7 illustrates an exemplary live migration architecture, according to one embodiment. There are two banks of 4 clients in the casino, and each of these 4 clients would preferably be located in a bank in proximity to each other. Each of these 8 clients may be concurrently served streams from a 16-instance server 710 that is rated as capable of generating streams for 16 clients. Typically, the 16-instance server may be located in a rack within the IT department of the casino.

In addition to the 16-instance server, there are two 4-instance servers 720 and 721, and each 4-instance server serves 4 clients in each bank. These 4-instance servers 720 and 721 may be co-located in the bank with their associated 4 clients. A client is being served a stream from a local 4-instance server is not immediately affected if the wider network fails (or the 16-instance server 710 must have maintenance performed on it). If a local 4-instance server fails, or network within the bank fails, at most 4 clients are affected. The 16-instance server and the two 4-instance servers 720 and 721 support live migration of stream generation.

Figure 8:
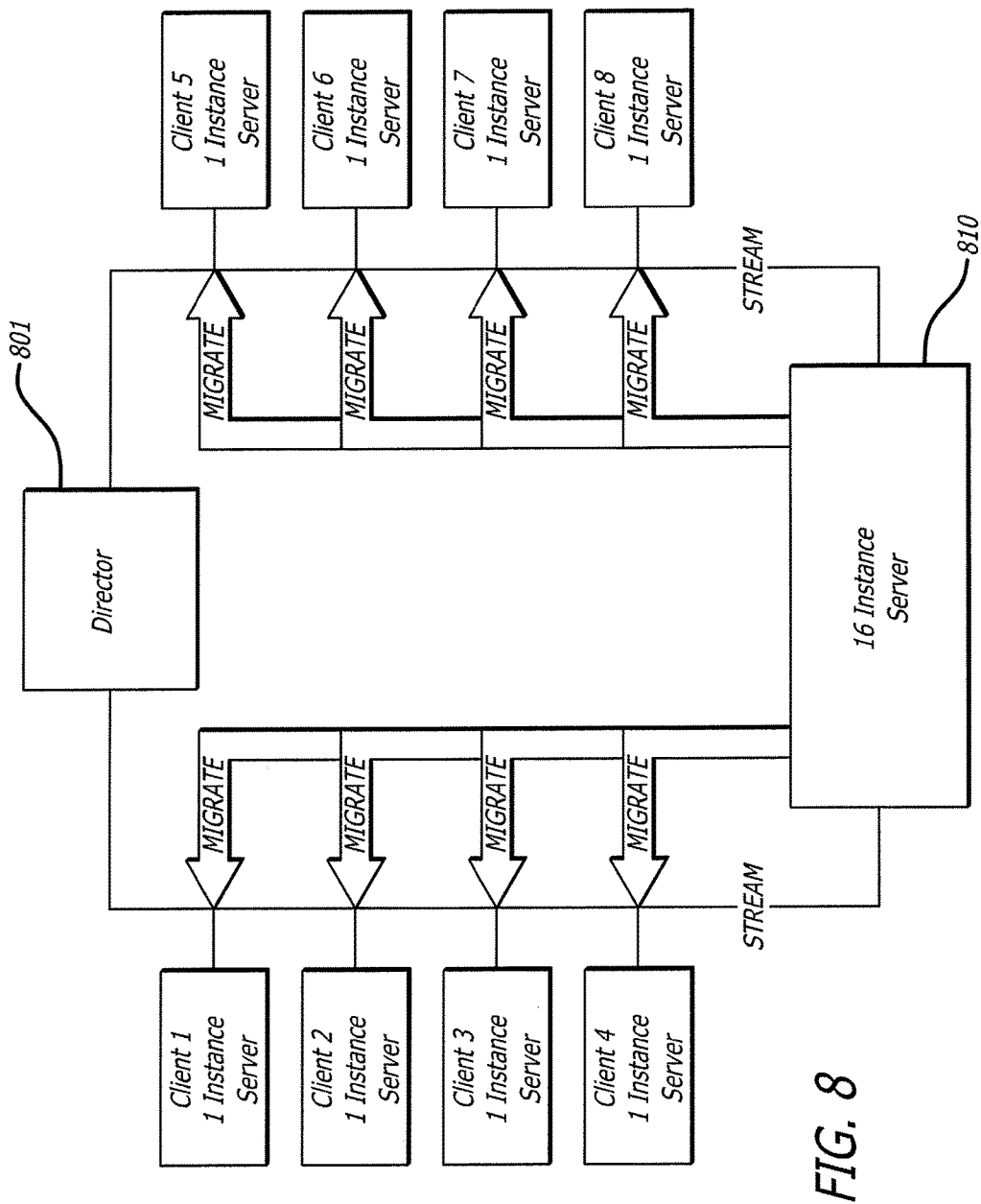
FIG. 8 illustrates an alternative live migration architecture, according to one embodiment.

FIG. 8 illustrates an alternative live migration architecture, according to one embodiment. While a client need only be capable of decoding video streams and passing input to a server, current levels of EGM hardware (e.g., Alpha 2 platform) are capable of both decoding streams and generating them in parallel, preferably through the use of virtual machines. In this embodiment, each EGM has a client and an instance server. The client may receive streams from either the 16-instance server 810 or the locally hosted instance server of the EGM. The director module 801 decides which server to use and handles migration of stream generation for the clients.

A player may select a game that is available on the remote instance server 810 and begin the game. The remote instance server 810 streams content of the game to the client. In the background, the game instance is migrated to a local server. Migration occurs when the director module 801 determines that the game instance is in a state that does not cause a downtime noticeable to the player. Once the game instance is migrated from the remote instance server 810 to the local server, there is no streaming network bandwidth requirement outside of the bank or the EGM until another game is selected.

Figure 9:
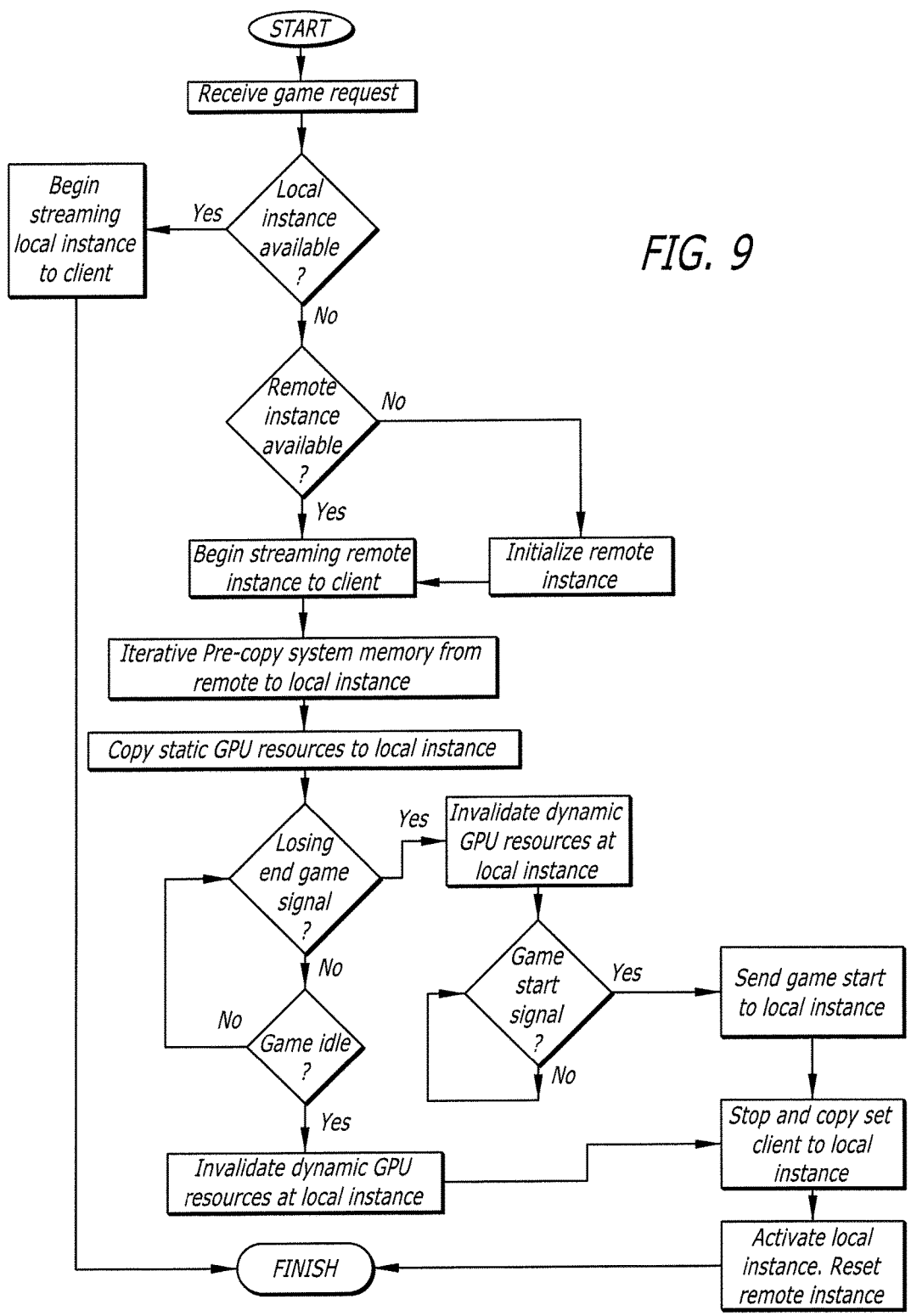
FIG. 9 shows a migration process of a game instance for a game, according to one embodiment.

FIG. 9 shows a migration process of a game instance for a game, according to one embodiment. The migration process does not take into account gaming specific knowledge. The director module performs the migration process. The director module also handles mixing of multiple streams so that content generated by a menu instance or a player tracking instance may also be superimposed on the stream when the stream is delivered to the client.

According to some embodiments, the migration process begins with a request to change game. This request may come from a player, a floor management system (e.g., Bally Control Center), or a slot accounting system. For example, a player inserts a player tracking card and receives the streaming of the last game that was played or a favorite game.

The director module checks if the game is available at a local instance server (e.g., the 4-instance server at the bank) and there is a virtual machine instance of the game running but not currently being played. If a local instance is available, the director module connects the local instance to the client and game play can commence. If the local instance is already connected to another client but is idle, the local instance may still be used by the other client for switching over to another instance. According to Nevada Gaming Control Board (NGCB) regulations, a client is considered to be in an idle state if there is no play for 5 minutes, no credits on the EGM, and no player tracking card inserted at the client.

If a local instance is not available, the director module checks if there is an instance running on a remote server. There may be multiple servers in a casino, each having many instances available concurrently.

If no remote instance is available, the director module makes a request to a VM allocator of the gaming enterprise system to initialize a VM instance of the game. Once this is complete, streaming to the client begins from the initialized VM instance.

The client receives the stream(s) from the VM instance running on the remote server, and passes inputs from the player back to the VM instance. The director module waits for a suitable period of time before continuing the migration process. This initial waiting period (e.g., 2 minutes) is set to handle a common scenario where a player browses available games without an intention to play a game, or only wants to try out the game. In this scenario, it would not be advantageous to immediately begin migration of the instance to a local server. Instead, the director module waits for an initial period of time to ensure that the player is likely to play the game. The director module may reply on other metrics to determine the waiting period of the migration process, such as a low coin-in amount or historical data that may suggest that the player in question only plays games for a shorter period of time.

After the initial waiting period, the director module begins the migration process. Referring to FIG. 9, the director module first pre-copies the content of the system memory from the remote instance over to an instance on a local server. Next, static GPU resources are copied.

During the migration process, the director module uses available information to determine the textures in the GPU video memory of the remove instance server that are static or dynamic, and pre-copies only the static textures. The director module further determines the textures that can be discarded and re-generated at the instance on the local server. This is in contrast to an approach of copying all video memory during "stop and copy." Therefore, the present migration process has less downtime and does not have a need for page fault support in the GPU hardware/driver.

The pre-copy process can be run at a low priority, both in terms of CPU usage and network bandwidth. It may take minutes to complete the pre-copy process, but a player would not notice that the pre-copy process is taking place because it runs in the background.

The "stop and copy" process, however, may cause a noticeable pause in a game play. This is because both of the virtual machines on the remote instance server and the local server must be suspended to allow final synchronization to take place. To mitigate this problem, the present system and method leverages a known cycle and game playing patterns of conventional games. Specifically, the present system and method detects the beginning and end of game cycles. Games are initiated by a press of a bet button by a player or a touch on a known area of the touchscreen(s). The inputs by the player are passed through the director module and intercepted to trigger a live migration event. Similarly, the end of a game cycle can be detected by monitoring SAS/G2S data generated by the VM instance. A game instance can be detected as being idle by monitoring a credit meter, a player tracking card event, and initiating a timer when both credits are zero and no player tracking card is inserted.

Using these data, the director module determines a suitable time for the "stop and copy" process. When the pre-copy process is finished, the director module waits for an "end game" signal or for the game to be idle. In particular, it is advantageous if the end game signal is associated with no win because at this point the game graphics can usually be seen to be fairly static, thus reducing the amount of dynamic textures to be updated. At this point, some GPU finalization takes place. Any dynamic textures are invalidated and re-loaded by the OpenGL graphics API in the new instance VM. As soon as the player initiates a new game, the "stop and copy" process takes place, before the signal is passed to the new instance. Due to the pre-copy process, the present system and method minimizes the downtime and does not perform the pre-copy process during a game cycle.

From a regulatory point of view, finalizing the migration of a live instance at a point of the initiation of a new game (or during an idle period) is useful because it ensures that only one VM instance is responsible for a particular game. If the migration process occurs at an arbitrary point, a game could start on one VM instance and finish on another VM instance posing a challenge in terms of jurisdictional approval under current regulations.

Figure 10:
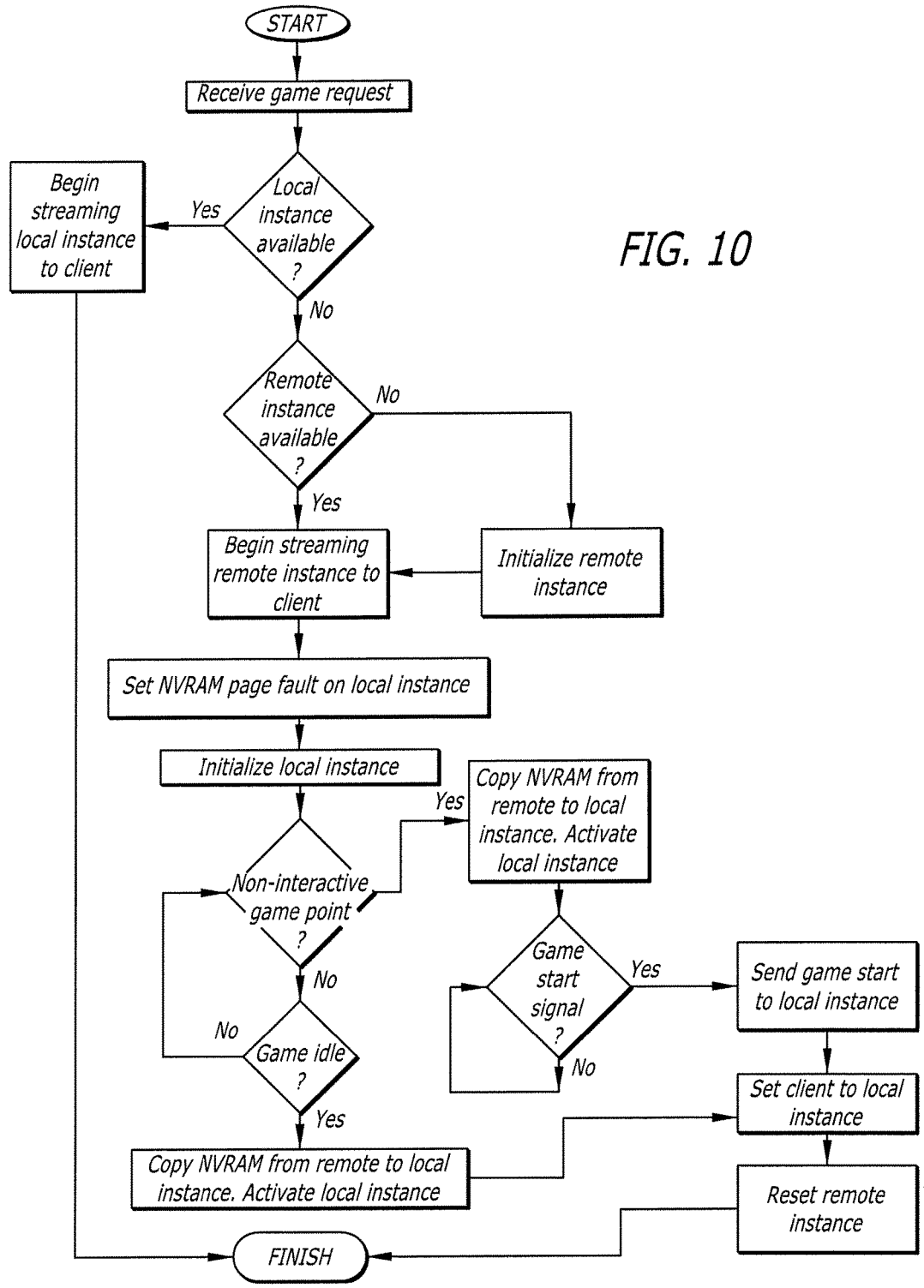
FIG. 10 is an exemplary migration process, according to another embodiment.

The present migration process is applicable to any game. FIG. 10 is an exemplary migration process, according to another embodiment. The migration process shown in FIG. 10 requires extra features present in typical regulated gaming software. The present migration process is useful in terms of less downtime and simpler implementation.

The present migration process does not involve a conventional live migration process because it is not dependent upon a live migration support in the VM hypervisor. Instead, the present migration process utilizes the fact that regulated gaming software must respond to a power failure in a graceful manner, restoring the state of the game to exactly the same point before power was lost. It also utilizes the facts that persistent game data is stored in non-volatile memory (e.g., NVRAM, flash memory) and that, to a large extent, game cycles are independent of each other. In a VM scenario, game data may be virtualized into a file.

The migration process begins as explained in FIG. 9 and continues until a migration is desired. At this point, a new VM instance is initialized, preferably using methods previously disclosed. The new instance is initialized with the same game configuration, but the difference is that access to the game state portion of the NVRAM is trapped by a CPU page fault. This causes the new instance to be suspended late in the game initialization sequence, a short period of time before the game is available to play. Notably, the new instance in this case may be located on either a local server or a remote server.

Initializing the instance on the local server requires giving file access from the local server to network attached storage (NAS) or other file system containing the game assets. Initializing the instance on a remote server requires a final (non-live) migration of the suspended instance once the page fault is trapped. This possibly requires more copying of data over the network, but has the usefulness of being predictable in network usage and quicker for initialization time as the file system would be either directly connected or connected over a high speed link.

Once the new instance is available at the local server in a suspended state, the director module waits for a suitable point to switch over to the new instance. For conventional casino type games, the switching point is during a non-interactive portion of a game. Another example of the switching point is after a win while credits increment, or during a free spin feature. At both of these switching points, the game cycle has essentially ended, and the game software is delivering an outcome that is fixed. If there were to be a power failure at this point, the game software would recover to exactly the same state. As such, this is a good time to copy the content of NVRAM from the remote instance to the local instance. NVRAM is relatively small (e.g., less than 1 MB) so such a copy would not take more than a second or two over the Ethernet network. Since the migration process is performed in the background during a time when the player may not interact with the game, it would be un-noticeable to the player. Once copied, the new instance is resumed from its suspended state. It immediately reads the NVRAM and configures itself to be an exact duplicate as the old instance. This also takes place in the background, and the player does not notice the migration from the old instance to the new instance.

During the migration process, the player may not initiate a new game, however, the migration process may be completed in a small enough time so that it would not be an issue. After the new instance reaches its final ready state, it signals the director module. As soon as the player makes the next bet (or makes any action such as changing the bet), the director module switches streams and inputs from the old instance to the new instance. Because the new instance is in the same state as the old instance, the new game cycle begins from the same point, and the player does not notice the switch. The remote instance can be de-commissioned, and game play continues from the local server.

Embodiments of the present migration process may include, but are not limited to: (1) Removal of high dependence on network for streaming architecture; (2) Solutions for live migration of gaming content that uses GPUs; (3) Minimal to un-noticeable downtime for a user; (4) Highly suitable for regulated markets—live migration takes place between games; (5) Availability of large library of games at any time to any player; (6) Failure mode removes or lowers performance of game change but does not prevent game play; (7) Solution for existing hardware, or bank-level servers; (8) Lower overall network bandwidth required, with resulting increase in reliability and lowering of contention issues; and (9) May be appropriate for other fields such as streaming video games. According to some embodiments, the migration process is performed by a Xen hypervisor running under Linux.

The various embodiments and examples described herein are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims. In addition, various embodiments may be combined. Therefore, reference to an embodiment, one embodiment, in some embodiments, in other embodiments, and the like does not preclude one or more methods, functions, steps, features, results, hardware implementations, or software implementations of different embodiments from being combined. Further, reference to an embodiment, one embodiment, in some embodiments, in other embodiments, examples, and the like provides various aspects that may or may not be combined with those of one or more different embodiments and/or examples.

From the foregoing it will be appreciated that, although specific embodiments have been described herein for purposes of illustration, various modifications may be made without deviating from the spirit and scope of the teachings. Accordingly, the claims are not limited by the disclosed embodiments.

What is claimed is:

1. A system for streaming game content, the system comprising:
   a host memory storing data representing a plurality of content packages;
   a host streaming server configured to host a plurality of virtual machines that each host a host instance of the plurality of content packages and provide selected instances of the content packages to a plurality of client gaming devices over a communication network;
   a plurality of local streaming servers, each local streaming server being associated with a group of client gaming devices and communicating over the communication network with the host streaming server, wherein each of the plurality of local streaming servers includes a local memory storing at least one content package of the plurality of content packages, and wherein each of the plurality of local streaming servers is configured to enable one or more local virtual machines to hosts a local instance of the host instance, each of the client gaming devices comprising:
   (i) at least one display device;
   (ii) a plurality of input devices including:
      (a) an acceptor of a first physical item associated with a first monetary value;
      (b) a cashout button actuatable to cause an initiation of a payout associated with a credit amount;
   (iii) at least one gaming device processor; and
   (iv) at least one gaming device memory device storing a game program;

a director module configured to control migration of the host instance to the local instance from the host streaming server to at least one of the plurality of local streaming servers, wherein the director module mixes multiple streams of content and enables a menu instance or a player tracking instance to be superimposed on the game content stream when the game content stream is delivered to the client gaming device and wherein the director module configured to determine an initial waiting period for streaming of the game content to a client gaming device based on game metrics including a coin-in amount and historical data of a player.

2. The system of claim 1, wherein the director module streams game content to the plurality of client gaming devices and routes input data of players to either the host streaming server or the plurality of local streaming servers.

3. The system of claim 1, wherein the host streaming server is a 16-instance server, and each of the plurality of local streaming servers is a 4-instance server.

4. The system of claim 1, wherein the director module, upon a requesting client device issuing a request for presentation of a content package, determines if the content package is initialized for streaming from the local instance to enable a local virtual machine to stream the content package to the requesting client.

5. The system of claim 4, wherein the director module further determines if the content package is available at the local virtual machine to control the host streaming server to (a) stream an instance of the content package to the requesting client from a host virtual machine, or, if no host virtual machine is initialized, (b) initialize an instance of the content package and to stream the content package to the requesting client, and (c) download the content package to a local memory associated with a logical group of the requesting client.

6. The system of claim 5, wherein the director module, after the content package is downloaded to the local memory, migrates the streaming of the content package from the host virtual machine to the local virtual machine during an idle period.

7. The system of claim 6, wherein a client gaming device presents a winning or losing outcome, and the director module migrates the streaming of the content package from the host virtual machine to the local virtual machine at the local streaming server during the idle period following a losing outcome.

8. The system of claim 1, wherein each of the plurality of client gaming devices is an electronic gaming machine having a client application and an instance server.

9. The system of claim 8, wherein the client application receives game content from either the host streaming server or the instance server of the EGM that handles migration of the host instance to the local instance.

10. The system of claim 1, wherein the director module pre-copies system memory of the host streaming server to the local instance, and copy static graphics process unit (GPU) resources to the local instance.

11. The system of claim 10, wherein the director module invalidates dynamic GPU resources at the local instance when the client gaming machine is in an idle state or at an end game signal.

12. The system of claim 11, the direct module sends a game start signal to the local instance and performs a stop-and-copy process to complete the migration of the host instance to the local instance.

13. A director module for controlling streaming game content, the director module comprising:
a host interface to a host streaming server, the host streaming server configured to host a plurality of virtual machines that each host a host instance of the plurality of content packages and provide selected instances of the content packages to a plurality of client gaming devices over a communication network, each of the client gaming devices comprising:
(i) at least one display device;
(ii) a plurality of input devices including:
(c) an acceptor of a first physical item associated with a first monetary value;
(d) a cashout button actuatable to cause an initiation of a payout associated with a credit amount;
(iii) at least one gaming device processor; and
(iv) at least one gaming device memory device storing a game program; and
an interface to a local streaming server associated with a group of client gaming devices, the local streaming server being configured to communicate over the communication network with the host streaming server;
wherein the director module configured to control migration of a host instance of game content to a local instance of a local streaming server from the host streaming server, wherein the director module mixes multiple streams of content and enables a menu instance or a player tracking instance to be superimposed on the game content stream when the game content stream is delivered to the client gaming device, and wherein the director module is configured to determine an initial waiting period for streaming of the game content to a client gaming device based on game metrics including a coin-in amount and historical data of a player.

14. The director module of claim 13, wherein the director module determines if the game content is available at a local virtual machine running on the local streaming server to (a) stream an instance of the game content to a requesting client from a host virtual machine.

15. The director module of claim 14, wherein the director module further determines, if no host virtual machine is initialized, (b) initialize an instance of the game content on the host streaming server and stream the game content to the requesting client, and (c) download the game content to a local memory associated with a logical group of the requesting client.

16. The director module of claim 15, wherein the director module, after the content package is downloaded to the local memory, migrates the streaming of the game content from the host virtual machine to the local virtual machine at the local streaming server during an idle period.

17. The director module of claim 16, wherein a client gaming device presents a winning or losing outcome, and the director module migrates the streaming of the game content from the host virtual machine to the local virtual machine at the local streaming server during the idle period following a losing outcome.

* * * * *